April 26, 1955     S. FORREST     2,706,993
CANOPY FOR VEHICLES
Filed Feb. 23, 1950

SYLVIA FORREST
INVENTOR

BY
ATTORNEY

United States Patent Office 2,706,993
Patented Apr. 26, 1955

2,706,993

CANOPY FOR VEHICLES

Sylvia Forrest, Lynbrook, N. Y.

Application February 23, 1950, Serial No. 145,865

3 Claims. (Cl. 135—7.1)

This invention relates to a sunshade type canopy for use on baby carriages and like vehicles.

An object of this invention is to provide a sunshade type canopy comprising two tubular upright arms having forked lower ends to slip over the pivot bolts usually provided on baby carriages and to be secured by the wing-nuts thereon.

Another object of this invention is to provide a sunshade type canopy having four ribs of U-shaped form, the lower ends of the ribs being formed into loops which are engaged by clamp bolts passing therethrough and joined by clamps adapted to engage the tubular upright arms so as to be jointly adjustable and clamped vertically on the arms to provide the desired sunshade effect.

Another object of this invention is to provide a fabric covering for the canopy and means for adjusting the covering fabric to remain in horizontal position so as to allow maximum passage of air under the canopy.

Another object of this invention is to provide retaining cords secured to the canopy covering fabric and to the carriage body to retain the covering fabric taut and in horizontal position.

Another object of this invention is to provide flexible hinge-like connections joining the ribs to the canopy fabric to permit folding the ribs and the covering fabric into adjoining relation on the carriage body.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which.

Figure 1:
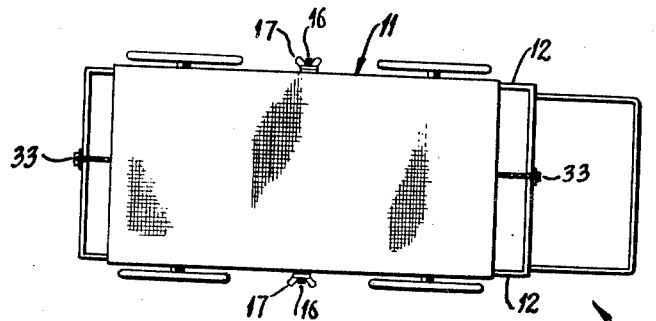
Figure 1 is a top plan view of a baby carriage to which my canopy is applied.
Figure 2:
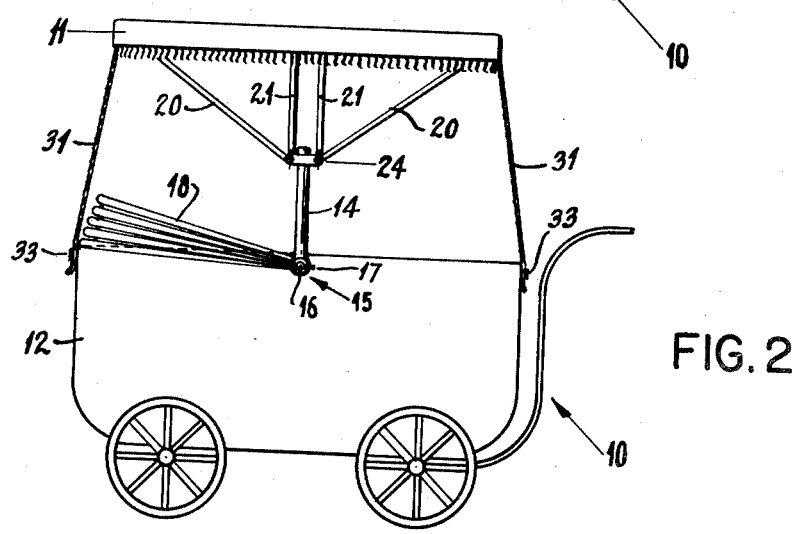
Figure 2 is a side elevation of the carriage and canopy shown in Figure 1.
Figure 3:
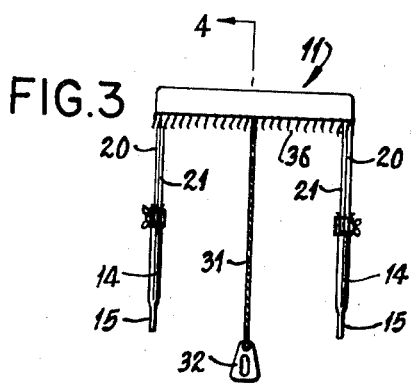
Figure 3 is an end view of the canopy.
Figure 4:
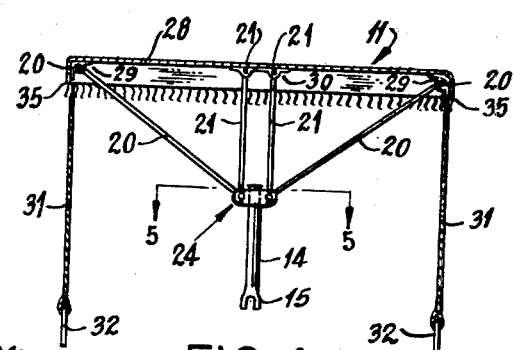
Figure 4 is a cross-sectional view of the canopy taken on line 4—4 in Figure 3.
Figure 5:
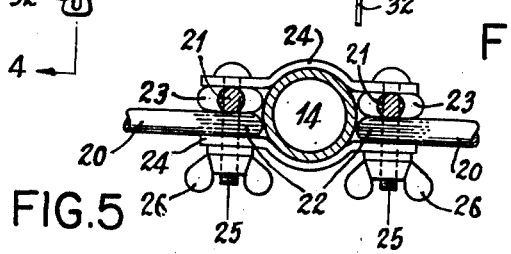
Figure 5 is a cross-sectional view taken on line 5—5 in Figure 4.

In the illustrated embodiment of the invention, the numeral 10 indicates a baby carriage to which my sectional canopy 11 is applied. The carriage 10 comprises a body having side walls 12, 12 terminating in an open top. The carriage is shown by way of an example as the invention may be applied to bicycles and the like.

The canopy 11 comprises two tubular arms 14 having forked lower ends 15 which are attachable to the carriage walls 12 by the pivot bolts 16 and wing nuts 17 on the carriage and which are used for securing the usual collapsible top 18 on the carriage body.

The canopy 11 comprises two U-shaped ribs 20 and two U-shaped ribs 21. In operating position, the ribs 20 are diagonally positioned and the ribs 21 are vertically positioned. The ribs 20 have loop-shaped lower ends 22. The ribs 21 have loop-shaped lower ends 23.

Slidably mounted on the tubular arms 14 are clamp members 24 through which pass bolts 25 having wing nuts 26 at their free ends. The bolts 25 pass through the looped ends 22 and 23 of the ribs 20 and 21. The bolts 25 and the wing nuts 26 serve for clamping the ribs 20 and 21 to the tubular arms 14 in selected upright position and in spaced-apart relation from the top of the carriage body.

The clamp members 24 have central portions of arcuate form designed for close engagement with the tubular arms 14 so that when the clamp members are secured on the tubular arms 14 by tightening the wing nuts 26, the canopy 11 is retained with the covering fabric 28 in horizontal position.

It will be noted that the ribs 21 are of considerably smaller extent in the upright direction than the ribs 20 to permit the covering fabric 28 to lie in a horizontal plane. The covering fabric 28 is secured to the horizontal portions of the U-shaped ribs 20 and 21 by suitable flexible hinge-like connections 29 and 30.

Retaining cords 31 are secured to the lengthwise portions of the canopy 11 and have apertured tabs 32. The cords are of a length to permit the tabs 32 to engage hooks or the like 33 on the front and rear of the carriage.

It is to be noted that the canopy 11 has an overhanging upright decorative portion or valance 35 which terminates in a circumscribing fringe 36.

In the embodiment of the invention shown in the drawings, the usual collapsible top 18 is shown in folded relation on the carriage body while the canopy 11 provides a sunshade which shields the eyes of the occupant from sun glare.

In accordance with the patent statutes I have described and illustrated the preferred embodiment of my invention, but it will be understood that various changes and modifications can be made therein without departing from the spirit of the invention as defined by the appended claims.

I claim:

1. A sunshade type canopy adapted for attachment to the pivot bolts of a baby carriage body, said canopy comprising a canopy top, two tubular arms positioned centrally and transversely of the canopy top and having forked lower ends adapted for securement by said bolts, said canopy further comprising an intermediate and an end pair of transverse and U-shaped ribs having looped lower ends, clamping members having semi-circular portions engaging said tubular arms, separate bolts passing through said clamping members and each engaging the looped ends of each pair of said ribs for clamping said looped ends to said tubular arms in selected elevated position, a fabric covering comprising the canopy top, flexible hinge-like connections securing said fabric to said ribs, and retaining cords securing the ends of said covering fabric to the said baby carriage body, whereby said canopy is retained with said covering in taut and horizontal position.

2. A sunshine type canopy having a canopy top, for a baby carriage body having pivot bolts in opposite sides thereof, comprising two tubular arms positioned centrally and transversely of the canopy top and having forked lower ends adapted for securement in upright position by said bolts, said canopy further comprising an intermediate and an end pair of transverse U-shaped ribs having looped lower ends, clamping members having arcuate portions engaging said tubular arms, separate bolts passing through said clamping members and engaging the looped ends of each pair of said ribs for clamping said ribs to said tubular arms in selected elevated position, a fabric covering comprising said canopy top, flexible hinge-like connections securing said fabric to said ribs, and retaining cords securing the ends of said covering fabric to the said carriage body, whereby said canopy is retained with said covering in taut and horizontal position on said baby carriage body.

3. A sunshade type canopy adapted for attachment to the pivot bolts of a baby carriage body, said canopy comprising a canopy top, two tubular arms positioned centrally and transversely of the canopy top and having forked lower ends adapted for securement by said bolts, said canopy further comprising a pair of spaced central and transverse U-shaped ribs having looped lower ends, said canopy also having a pair of transverse U-shaped angularly disposed ribs having looped lower ends at each end thereof, separate means for clamping said looped ends of each pair of ribs to said pair of arms in selected elevated position, a fabric constituting the canopy top, flexible hinge-like connections securing said fabric to said ribs, and retaining cords securing the ends of said covering fabric to the said baby carriage body whereby said canopy is retained with said covering in taut and horizontal position.

References Cited in the file of this patent

UNITED STATES PATENTS

| 2,134,855 | Bucher | Nov. 1, 1938 |
| 2,405,348 | Engelheart | Aug. 6, 1946 |

FOREIGN PATENTS

| 25,920 of 1908 | Great Britain | Dec. 1, 1908 |
| 188,761 | Great Britain | Nov. 15, 1922 |